United States Patent
Barth et al.

(10) Patent No.: US 11,878,708 B2
(45) Date of Patent: Jan. 23, 2024

(54) METHOD AND SYSTEM FOR MONITORING AN OCCUPANT OF A VEHICLE

(71) Applicant: Aptiv Technologies Limited, St. Michael (BB)

(72) Inventors: Alexander Barth, Wermelskirchen (DE); Douglas L. Welk, Rossville, IN (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/805,197

(22) Filed: Jun. 2, 2022

(65) Prior Publication Data

US 2022/0388527 A1 Dec. 8, 2022

(30) Foreign Application Priority Data

Jun. 4, 2021 (EP) ..................................... 21177702

(51) Int. Cl.
| | |
|---|---|
| *B60W 40/08* | (2012.01) |
| *B60W 50/14* | (2020.01) |
| *G06V 40/16* | (2022.01) |
| *G06V 10/82* | (2022.01) |
| *G06V 40/10* | (2022.01) |
| *G06V 10/62* | (2022.01) |
| *G06V 20/59* | (2022.01) |

(Continued)

(52) U.S. Cl.
CPC ............ *B60W 50/14* (2013.01); *B60W 40/08* (2013.01); *G06V 10/62* (2022.01); *G06V 10/82* (2022.01); *G06V 20/593* (2022.01); *G06V 40/103* (2022.01); *G06V 40/171* (2022.01); *G06V 40/174* (2022.01); *G06V 40/20* (2022.01); *B60W 2050/0083* (2013.01); *B60W 2050/146* (2013.01); *B60W 2420/42* (2013.01); *B60W 2540/223* (2020.02)

(58) Field of Classification Search
CPC .... B60W 50/14; B60W 40/08; G06V 40/174; G06V 40/171; G06V 40/103; G06V 40/20; G06V 10/82; G06V 10/62; G06V 20/593

See application file for complete search history.

(56) References Cited

U.S. PATENT DOCUMENTS 9,795,322 B1 * 10/2017 Karunaratne ........ A61B 5/6891
10,850,693 B1 12/2020 Pertsel et al.

(Continued)

FOREIGN PATENT DOCUMENTS

| | | |
|---|---|---|
| EP | 1530525 | 5/2008 |
| KR | 100779739 | 11/2007 |

OTHER PUBLICATIONS

"Extended European Search Report", EP Application No. 21177702.4, dated Dec. 10, 2021, 10 pages.

(Continued)

*Primary Examiner* — Benyam Haile
(74) *Attorney, Agent, or Firm* — Colby Nipper PLLC (57) ABSTRACT

Systems and techniques are provided for monitoring an occupant located in an interior of a vehicle. The techniques include the detection an occupant in at least one image. Body points of the occupant are identified based on the at least one image, and a pose of the occupant is classified based on the detected body points. A recommendation for adapting the occupant's pose is provided based on the classified pose.

20 Claims, 3 Drawing Sheets

(51) Int. Cl.
    *G06V 40/20*           (2022.01)
    *B60W 50/00*          (2006.01)

(56) References Cited

U.S. PATENT DOCUMENTS

| | | |
|---|---|---|
| 2003/0079929 A1 | 5/2003 | Takagi et al. |
| 2005/0046584 A1* | 3/2005 | Breed .................. G01S 7/4802 340/13.31 |
| 2018/0014754 A1* | 1/2018 | Gray .................... A61B 5/7455 |

OTHER PUBLICATIONS

"Good Driving Posture: Do You Sit Correctly in Your Car?", https://norwestchiro.co.nz/good-driving-posture, Sep. 9, 2019, 6 pages.

"How to Sit—Sitting at a desk", Retrieved at: https://www.french-chiropractic.com/how-to-sit/—on May 18, 2022, 3 pages.

Johnston, "4 Essential Things to Know About Your Car's Headrests", https://www.yourmechanic.com/article/4-essential-things-to-know-about-your-car-s-headrests, Dec. 15, 2015, 6 pages.

Johnston, "How to Buy a Good Quality Driver's Seat Cushion", https://www.yourmechanic.com/article/how-to-buy-a-good-quality-driver-s-seat-cushion, Dec. 22, 2015, 6 pages.

Savacool, "The Healthiest Way to Sit in Your Car", Retrieved at: https://www.mensjournal.com/health-fitness/the-healthiest-way-to-sit-in-your-car-20160120/—on May 18, 2022, 10 pages.

Thomas, "How to avoid back pain in the car", https://www.posturite.co.uk/blog/avoid back-pain-car, Jan. 21, 2020, 7 pages.

Unrau, "How to Avoid Back Pain in a Car", https://www.yourmechanic.com/article/how-to-avoid-back-pain-in-a-car-by-jason-unrau, May 31, 2016, 22 pages.

\* cited by examiner

METHOD AND SYSTEM FOR MONITORING AN OCCUPANT OF A VEHICLE

INCORPORATION BY REFERENCE

This application claims priority to European Patent Application Number EP21177702.4, filed Jun. 4, 2021, the disclosure of which is incorporated by reference in its entirety.

BACKGROUND

In many vehicles, devices and systems are nowadays installed for monitoring a driver and further occupants. Such devices and systems may be referred to as cabin sensing solutions. Cameras or other imaging sensors are capturing image data from the interior of a vehicle and process these images to extract information on the driver state, including base features such as eye-opening state, viewing direction, or localization of other body parts. Such image data may be used for a high-level interpretation in order to detect, for example, drowsiness or distraction of the driver. The base features extracted from the image data are typically used for applications supporting the driver.

For a proper seating pose of occupants within a vehicle, however, general recommendations are usually available only, e.g., provided by national automobile associations. These recommendations refer, for example, to avoiding backpain in a vehicle by adjusting the height of a seat and a seat back angle correctly with respect to the size and the body shape of the respective occupant. Furthermore, recommendations are available how to adjust a steering wheel regarding height and distance with respect to the driver of the vehicle in order to hold the steering wheel properly.

However, such general recommendations may not easily be customized for the specific occupant. In addition, the occupant's pose is usually not controlled over a certain time period with respect to the seat and the steering wheel. Therefore, the occupant may not notice for quite a long time that his or her pose is quite unfavorable and may provoke e.g., backpain. Instead, the occupant may notice the impact of an unfavorable pose after a long ride when he or she is going to leave the vehicle.

Accordingly, there is a need to have a method and a system which are able to monitor an occupant in a vehicle and to provide recommendations for improving a pose of the occupant.

SUMMARY

The present disclosure provides a computer-implemented method, a system, a computer system and a non-transitory computer readable medium according to the independent claims. Embodiments are given in the subclaims, the description and the drawings.

In one aspect, the present disclosure is directed at a computer-implemented method for monitoring an occupant located in an interior of a vehicle. According to the method, at least one image of the occupant is detected via a sensing device. Via a processing unit, body points of the occupant are identified based on the at least one image, and a pose of the occupant is classified based on the detected body points. Via an output unit, a recommendation for adapting the occupant's pose is provided based on the classified pose.

The sensing device may be any device which is able to provide some form of an image, e.g., a camera, for example a NIR camera, a RGB camera, a RGB-IR camera, a time-off-flight camera, a stereo camera, a thermal camera, a radar or Lidar sensor, or some other imaging device that is configured to generate at least one channel of image information (i.e., two-dimensional images). The sensing device may further be able to support the acquisition of temporal image sequences.

The sensing device is positioned in the interior of the vehicle and may be configured to capture an image of at least one occupant in a seat and to cover at least the half of the occupant's body in its instrumental field of view. The at least one image detected by the sensing device may cover the occupant's full upper body, i.e., the head region down to the hips. Alternatively, e.g., for a top down camera, only the part from the shoulders down to the legs may be available. In this case some of the features described below, e.g., classifying facial expressions, may not be available.

Two-dimensional images or temporal image sequences may be processed by the processing unit using a neural network as well as pre- and post-processing algorithms in order to detect the body points of the occupant, wherein the body points may be located at the occupant's head, shoulders, elbows, hips, knees etc. That is, the body points may be "key" points e.g., at the joints of the occupant's arms or legs, and/or some characteristic points in the occupant's face. However, any point which can be identified and tracked by the sensing device may be suitable as a body point, e.g., a point at the occupant's belly or back, or even a texture in the occupant's clothing Hence, the list of examples for the body points provided above is not exhaustive.

In addition, the neural network may provide a pose classification for the occupant in order to analyze whether the occupant is seated in a healthy way. In other words, classifying the occupant's pose e.g., via a neural network analyzes the occupant's seating position and determines whether the current seating configuration is considered as healthy and comfortable, which may represent one of the classes for the occupant's pose. In contrast, seating positions may be identified which may lead to tenseness or might trigger discomfort or pain on a longer ride. For example, the method may detect whether the occupant is constantly leaning to one side or forward with one of the shoulders low, or whether the occupant has an unfavorable head orientation that will increase discomfort after some time. Hence, the method according to the disclosure is able to detect a potentially problematic pose or seating position of the occupant before he or she actually feels the discomfort.

As a result, the method provides the recommendation to the occupant, e.g., for changing the pose or the seating position. For example, the method may indicate how to sit differently to improve the wellbeing. On a long ride, the method may also encourage the occupant to change the position after some time if no change of the pose has been detected for some time period.

The output unit may provide the recommendation for adapting the occupant's pose via some visual response, e.g., an icon or a dialog which is shown on a head-up display or on a screen of an infotainment system. For example, an icon may be shown which is similar to a coffee pot icon which may occur in other applications when drowsiness of a driver may be detected. Additionally or alternatively, a short animation or a videoclip may be shown in order to motivate the occupant to change the seating position, to do some stretching or to have a break.

The method according to the disclosure is therefore able to improve the occupant's pose interactively during driving. Since individual body points are detected which are characteristic for the respective occupant, classifying the occupant's pose and providing recommendations is customized to the specific occupant having individual positions for the body points located e.g., at the head, the shoulders, the elbows etc. Hence, the method may flexibly provide individual recommendations for the specific occupant.

The method may comprise one or more of the following features:

An image sequence may be detected via the sensing device. Via the processing unit, a temporal sequence of the body points may be determined based on the image sequence, displacement vectors may be estimated for each of the body points by using the temporal sequence, and a movement of the occupant may be classified based on the displacement vectors. The recommendation for adapting the occupant's pose may be provided further based on the occupant's classified movement.

The body points may include facial points which may be identified and tracked based on the image sequence, and via the processing unit, a facial expression may be derived and classified based on the detected facial points via the processing unit. The recommendation for adapting the occupant's pose may be provided further based on the classified facial expression. In addition, a seating comfort score may be determined based on the occupant's classified pose, movement and/or facial expression via the processing unit, and the recommendation for adapting the occupant's pose may be based on the seating comfort score. The recommendation for adapting the occupant's pose may be provided only if the seating comfort score is less than a predetermined threshold.

A position of the occupant may be monitored over a predefined time period by identifying the body points at a beginning and at an end of the predefined time period, and the recommendation for adapting the occupant's pose may be provided if the occupant's position has not changed during the predetermined time period.

The occupant may be located on a driver seat, and the body points may include shoulder points, arm points and/or hand points. A relative position of the shoulder points, the arm points and/or the hand points may be determined with respect to a steering wheel of the vehicle. Based on the relative position, a recommendation may be provided, via the output unit, for adapting the steering wheel.

A response of the occupant to the recommendation may be acquired by an input unit, and the response may include accepting or rejecting the current recommendation. A quantity and/or a type of future recommendations may be determined in accordance with the occupant's response. If the occupant accepts the current recommendation, the output unit may propose guided activities for the occupant which may depend on a driving condition and an environment of the vehicle. The occupant's pose may be classified further based on a profile of the occupant which is stored in the processing unit.

According to an implementation, an image sequence may be detected via the sensing device. Via the processing unit, a temporal sequence of the body points may be determined based on the image sequence, displacement vectors may be estimated for each of the body points by using the temporal sequence, and a movement of the occupant may be classified based on the displacement vectors. Via the output unit, the recommendation for adapting the occupant's pose may be provided further based on the occupant's classified movement.

For this implementation, the recommendation for adapting the occupant's pose may be based not only on a static seating position derived from body points in an image at a certain point in time. In addition, the occupant's actions may be taken into account by classifying the movement of the occupant based on the displacement vector. For example, a hand frequently reaching to the occupant's neck or back or performing massage-like movements may indicate the beginning of discomfort for the occupant. Similarly, such a starting discomfort may be indicated by stretching the head and shoulder regions in a certain characteristic manner to relief the muscles, e.g., by circular shoulder or head movements. The classification of the occupant's movement may also be performed by a neural network. Since the occupant's actions are additionally taken into account, the reliability of the method for recognizing the beginning of discomfort may be improved.

According to another implementation, the body points may include facial points which may be identified and tracked based on the image sequence, and a facial expression may be derived and classified based on the identified facial points via the processing unit. The recommendation for adapting the occupant's pose may be provided further based on the classified facial expression via the output unit.

The occupant's facial expression may additionally be indicating overall negative mood or discomfort which may be related to the occupant not seated in a comfortable and healthy way. On the other hand, facial expressions may be related to comfort and an overall positive mood suggesting that the occupant may be seated properly. Hence, additionally considering facial expressions may support the method in identifying discomfort of the occupant due to an improper seating position at an early stage.

According to a further implementation, a seating comfort score may be determined based on the occupant's classified pose, movement and/or facial expression via the processing unit, and the recommendation for adapting the occupant's pose may be based on the seating comfort score. The recommendation for adapting the occupant's pose may further be provided only if the seating comfort score is less than a predetermined threshold. The seating comfort score may therefore combine the information derived from the analysis of the static pose, of the action or movement and of the facial expression of the occupant. That is, the seating comfort score may be a combined indicator of comfort and well-being.

Due to the consideration of three different aspects, the resulting recommendation for the occupant may be more reliable and better to be customized for the specific occupant. Providing the recommendation for a low seating comfort score only, i.e., less than the predetermined threshold, may suppress superfluous messages for the occupant on a display or a screen.

A position of the occupant may be monitored over a predetermined time period by identifying the body points at a beginning and at an end of the predefined time period. The recommendation for adapting the occupant's pose may be provided if the occupant's position has not changed during the predetermined time period. This aspect may be highly relevant during a long ride of the occupant. The occupant may be encouraged by the recommendation to change his or her position in order to avoid discomfort before the occupant is able to feel it. Monitoring the occupant's position may therefore be an additional source of information on which the recommendation for the occupant may be based.

According to a further implementation, the occupant may be located on a driver seat. The body points may include shoulder points, arm points and/or hand points. In this case, the relative position of the shoulder points, the arm points and/or the hand points may be determined with respect to a steering wheel of the vehicle. Based on the relative position, a recommendation may be provided, via the output unit, for adapting the steering wheel. An improper position of the occupant with respect to the steering wheel may be a further source for discomfort during driving. Hence, an additional recommendation may be provided for adapting the steering wheel based on its relative position with respect to selected body points of the occupant.

A response of the occupant to the recommendation may be acquired by an input unit, wherein the response may include accepting or rejecting the current recommendation. A quantity and/or a type of future recommendations may be determined in accordance with the occupant's response. Hence, the occupant may be able to control the quantity and/or the type of recommendations interactively. This may facilitate the adaptation or customization of the recommendations and of the entire method for the specific occupant. Accepting or rejecting the current recommendation may be performed by using a gesture command, a voice input, a button to be pressed, or a touchscreen command By considering the occupant's response, undesired recommendations may be suppressed during the further course of a drive.

If the occupant accepts the current recommendation, the output unit may propose guided activities for the occupant which may depend on a driving condition and an environment of the vehicle. That is, the proposed activities may be adapted to the "context" of the occupant's journey at the actual point in time. For example, if the vehicle is in a traffic jam or stops at a traffic light (which may be noticed by determining the vehicle's velocity), the guided activities may include some small exercises or some cabin sports. In addition, the guided activities may be based on a prediction for good places to stop along the intended route of the vehicle if the vehicle is equipped e.g., with a positioning device and a map device. For example, the current recommendation and the guided activities may include a proposal to stop the vehicle at e.g., a park located close to the intended route and to leave the vehicle for a while for performing some recommended exercises. The guided activities may also be provided during automated driving. In summary, the guided activities may obviate discomfort for the occupant at an early stage. Furthermore, the sensing device and the processing unit may be used for supervising the guided activities if this may be desired by the occupant.

According to a further implementation, the occupant's pose may be classified further based on a profile of the occupant which is stored in the processing unit. The profile may be input to the processing unit manually or based on identifying body and facial points derived from an image sequence. The occupant's profile may further include responses to former recommendations provided by the output unit. Furthermore, the occupant's profile may also include a logged or recorded seating comfort score determined during former rides and stored in the processing unit. By this means, the occupant's profile facilitates customizing the method to the specific occupant since it affects classifying the occupant's pose. Hence, the occupant's feedback may be enclosed in the occupant's profile, and therefore a feedback loop may be accomplished in the method for classifying the occupant's pose properly. Moreover, individual preferences and comfort levels may be considered via the occupant's profile when the recommendation is to be provided based on the classified pose.

In another aspect, the present disclosure is directed at a system for monitoring an occupant located in an interior of a vehicle. The system comprises a sensing device configured to detect at least one image of the occupant, a processing unit configured to identify body points of the occupant based on the at least one image and to classify a pose of the occupant based on the detected body points, and an output unit configured to provide a recommendation for adapting the occupant's pose based on the classified pose.

As used herein, the terms processing device, processing unit and module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

In summary, the system according to the disclosure includes a sensing device, a processing unit and an output unit which are configured to perform the steps as described above for the corresponding method. Therefore, the benefits, the advantages and the disclosure as described above for the method are also valid for the device according to the disclosure.

According to an implementation, the system may further comprise an input unit configured to acquire a response of the occupant to the recommendation, wherein the response may include accepting or rejecting the current recommendation. A quantity and/or a type of future recommendations may depend on the occupant's response.

The processing unit may include a machine learning algorithm or a rule-based logic for classifying the occupant's pose. Furthermore, the sensing device may be further configured to detect facial points, and the processing unit may be configured to classify a facial expression based on the facial points. The output unit may be configured to provide the recommendation for adapting the occupant's pose further based on the facial expression.

In another aspect, the present disclosure is directed at a computer system, said computer system being configured to carry out several or all steps of the computer-implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer-implemented method described herein.

In another aspect, the present disclosure is directed at a non-transitory computer readable medium comprising instructions for carrying out several or all steps or aspects of the computer-implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; and or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer-implemented method described herein.

BRIEF DESCRIPTION OF THE DRAWINGS

Example implementations and functions of the present disclosure are described herein in conjunction with the following drawings, showing schematically.

DETAILED DESCRIPTION

Figure 1:
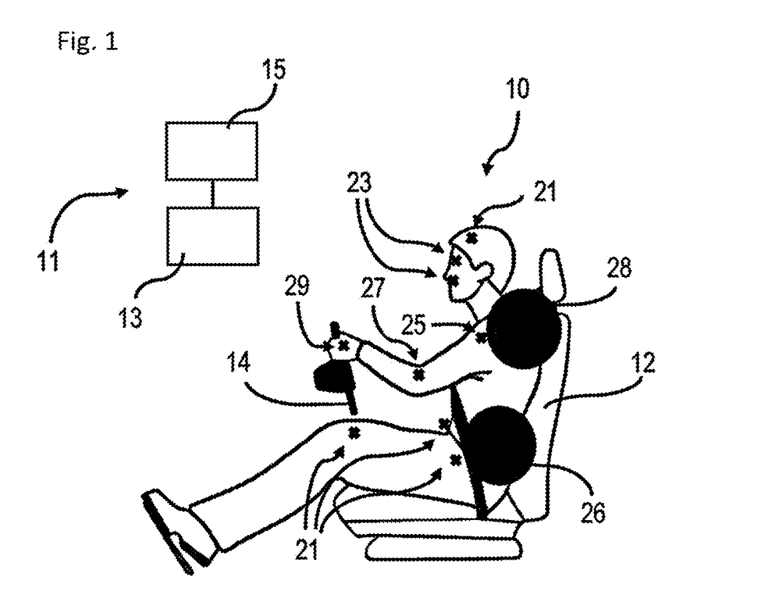
FIG. 1 depicts an occupant in a vehicle which is monitored by a system according to the disclosure.

FIG. 1 schematically depicts an occupant 10 in the interior of a vehicle which is monitored by a system 11 according to the disclosure. The occupant 10 is sitting on a driver seat 12 and has therefore his or her hands on a driving wheel 14 of the vehicle.

Figure 2:
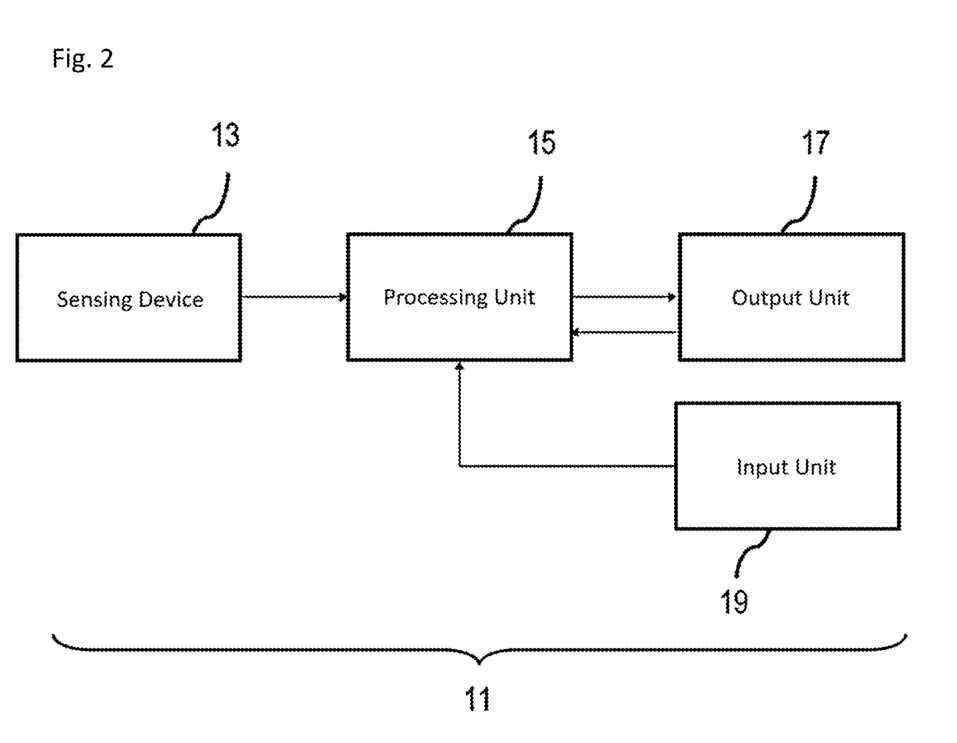
FIG. 2 depicts an overview of the system according to the disclosure.

The system 11 includes a camera as a sensing device 13 which is connected to a processing unit 15 (see also FIG. 2). The processing unit 15 is configured to analyze a sequence of images provided by the camera 13. The system 11 further includes an output unit 17 which is configured to provide recommendations for adapting a pose of the occupant 10 based on information provided by the processing unit 15, as will be explained in detail below. In addition, the system includes an input unit 19 which allows the occupant 10 to provide input information for the system in response to the recommendations provided by the output unit 17. Hence, the input unit 19 is in communication with the processing unit 15.

Furthermore, body points 21 are shown in FIG. 1. The body points 21 include facial points 23, shoulder points 25, arm points 27 and hand points 29 as well as further body points 21 which are located e.g., at the head, in the back, the hips and/or the knees of the occupant 10. However, these examples for body points 21 are not exhaustive. The body and facial points 21, 23 are detected as part of an image sequence 31 (see also FIG. 3) which is captured by the camera 13, and they are identified via the processing unit 15 by using neural networks as well as pre- and post-processing algorithms.

As shown in the upper part of FIG. 1, the occupant's pose on the seat 12 is obviously not favorable, especially in a region 26 of the occupant's back and in the region 28 close to the occupant's shoulders. During driving, the pose of the occupant 10 as shown in the upper part of FIG. 1 will generate discomfort for the occupant 10 and may even cause pain in the back and at the neck or at the shoulders of the occupant 10. Therefore, the system 11 and the method according to the disclosure are intended to provide recommendations for improving the pose of the occupant 10. Based on these recommendations, the occupant 10 will be able to adapt his or her pose in order to achieve a proper pose as shown in the lower part of FIG. 1. This corrected pose will increase the comfort of the occupant 10 and prevent pain in the back, at the shoulders and at the neck of the occupant 10.

The sensing device or camera 13 is a RGB camera in the present implementation of the system 11. Alternatively, the camera may also be a NIR camera, a RGB-IR camera, a time-of-flight camera, a stereo camera, a thermal camera or some other imaging device that is able to generate at least one channel of image information, i.e., a two-dimensional image of the occupant 10 in the interior of the vehicle.

Figure 3:
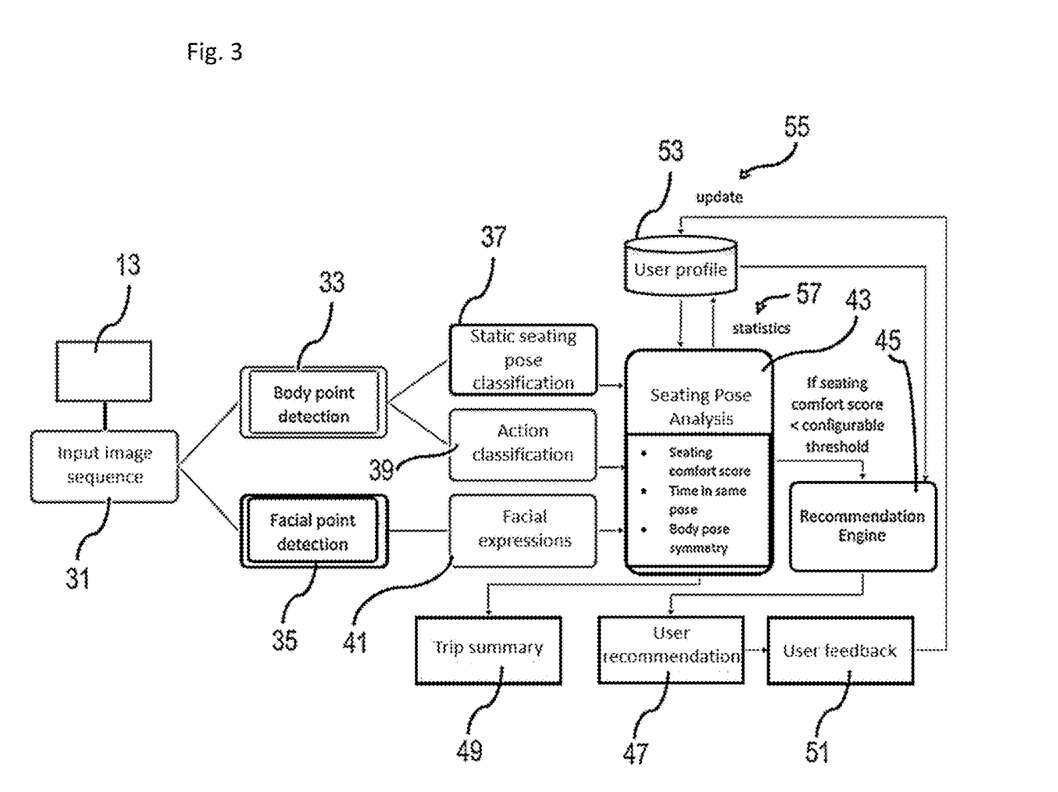
FIG. 3 depicts method steps performed by the system shown in FIG. 2.

FIG. 3 depicts a schematic overview of the steps performed by the method according to the disclosure by using the system 11 as shown in FIG. 2. The camera 13 is able to acquire a temporal image sequence 31. The camera 13 is further configured to capture the images for the majority of the occupant's body, e.g., the region from the head down to the knees.

The processing unit 15 receives the image sequence 31 as an input and processes the image sequence 31 by using a sequence of algorithms, i.e., a neural network as well as pre- and post-processing algorithms. That is, the processing unit 15 performs a body point detection 33 and a facial point detection 35 in order to identify the body points 21 and the facial points 23 based on the image sequence 31.

The facial and body points 21, 23 are identified by using a neural network which is part of the processing unit 15 and which is trained for identifying the points 21, 23 within rectangular regions of interest which are related to body and face candidates. That is, the points 21, 23 are extracted within identified body and face regions. In addition, the processing unit 15 provides an absolute position of the points 21, 23 as well as relative positions between those in order to be able to distinguish different seating poses of the occupant 10, i.e., body postures in the seat 12 (see FIG. 1).

Based on the body point detection 33, the processing unit 15 performs a static seating pose classification 37 (see FIG. 3). That is, the absolute and relative positions of the points 21, 23 are used for a classification of the static pose of the occupant 10 in the seat 12 (see FIG. 1). The classification is performed by a further stage of the neural network which is implemented in the processing unit 15. Parameters or weights of the neural network are determined in training steps which use training samples of poses of a plurality of occupants 10 as a ground truth. As an alternative, the processing unit 15 may perform the classification of the body points 21 by using a decision tree or any other machine learning algorithm or some rule-based logic which takes into account locations of body parts, relative distances between predefined body points and/or distances of known reference points in the interior of the vehicle.

The neural network of the processing unit 15 is trained to distinguish an upright seated occupant having a proper pose from an occupant e.g., leaning forward or to a side or having a bended posture etc. Furthermore, the processing unit 15 also uses the shoulder points 25, the arm points 27 and the hand points 29 if the occupant 10 is the driver of the vehicle in order to assess the relative position of these "key" points 25, 27, 29 with respect to the steering wheel 14 (see FIG. 1) of the vehicle. For example, an angle of elbows of the occupant 10 may be estimated or classified. By this means, the processing unit 15 determines whether the steering wheel 14 is too close, too far or in a good distance with respect to the occupant 10.

In addition to the static seat pose classification 37, the processing unit 15 performs an action classification 39 based on the body point detection 33. The action classification 39 is used to identify specific movements and body actions of the occupant 10. Such movements can indicate e.g., pain in the lower back of the occupant 10. The occupant may also stretch his or her upper body in order to avoid pain and to relax the muscles in this body area. Another example for specific movements are rotational movements of the shoulders.

For the action classification 39, the body points 21 are tracked over consecutive frames of images within the temporal image sequence 31. Between two frames of images, a respective displacement vector is estimated for each of the body points 21. In addition, further body points 21 which are less relevant for the static seating pose classification 37 are taken into account, e.g., body points 21 located on the chest or in the belly region of the occupant 10. In order to determine suitable body points 21 to be tracked for the action classification 39, the texture of the occupant's clothing can be used to find good features or body points 21 for the tracking. Moreover, a pixelwise segmentation of the occupant's upper body is used for the tracking of the body points 21 and for identifying the occupant's movements. The pixelwise segmentation is achieved using a deep neural network.

As an alternative, foreground/background segmentation approaches based on a background model may also be applied. Furthermore, some body points 21 may be connected by a polygon contour (e.g., shoulder points and hip points) instead of a pixelwise segmentation, and the polygon contour may be tracked based on the image sequence 31.

In addition, a tracking procedure may be implemented which is configured to identify and to track a continuous region based on the image sequence 31. In other words, the optical flow of the continuous region may be considered. Such a tracked region has an unambiguous characteristic, e.g., the same or a similar texture at the occupant's clothing By tracking the region as a whole, the displacement vector as described above can be defined for the entire region. Therefore, the region based tracking can be used if no individual reference or body point can be tracked for the specific occupant.

The amount or absolute value of the displacement vector is mapped for each body point 21 to an activity value or index using a mapping function. For identifying the occupant's movements, a mean over the absolute values of the displacement vectors may be estimated which are selected for body points 21 belonging to a certain body region. In addition, such a mean of all displacement vectors over the full body of the occupant 10 is estimated in order to determine the general extent to which the occupant 10 is moving. In order to classify or assess the action or movement of the occupant 10, the length of the displacement of body points 21 is normalized for different body regions, e.g., by subtracting a mean displacement which is averaged over the body points within the same body region. Moreover, relative displacement vectors are computed between different body regions in order to identify and classify the movement of the occupant 10.

Based on the facial point detection 35, facial expressions 41 are derived for the occupant 10. That is, the facial points 23 are classified, e.g., by a further stage of the neural network within the processing unit 15, to derive the facial expressions 41. The facial expressions may be related to discomfort indicating that the occupant 10 is not seated in a comfortable and healthy way. Conversely, the facial expressions may also indicate an overall positive mood for the occupant 10 indicating comfort.

Based on the static seating pose classification 37, the action classification 39 and the facial expressions 41, the processing unit 15 performs a seating pose analysis 43 for the occupant 10. The seating pose analysis 43 generates signals which are used as an input for a recommendation engine 45 which is part of the output unit 17 (see FIG. 2). The signals which are provided for the recommendation engine 45 include a time for the occupant 10 being in a current pose, i.e., without body activity wherein movements of arms and hands are ignored. The signals further include the seating pose comfort score and the activity index as described above.

As also mentioned above, displacements of the body points 21 as well as the absolute and relative positions of the body points 21 are identified and classified via a neural network. The classification results in a likelihood score for the seating comfort of the occupant 10 which is also referred as the seating pose comfort score. Due to the displacements of the body points 21, characteristic movements indicating discomfort are also considered when estimating the seating pose comfort score.

Moreover, the facial expressions are also taken into account. That is, the seating pose comfort score is reduced if the facial expressions 41 suggest discomfort or negative mood. Conversely, the seating pose comfort score is increased for a neutral or positive mood derived from the facial expressions 41.

If a time-of-flight camera is used as the sensing device 13, three-dimensional information is provided and the angles between the upper body and the legs of the occupant 10 can be accurately measured. If no three-dimensional information is available, e.g., for a typical RGB camera, similar information can be approximated from the two-dimensional images of the image sequence 31 (see FIG. 3). In addition, the seating pose analysis 43 includes determining the symmetry of the body pose of the occupant 10.

The recommendation engine 45 (see FIG. 3) receives the results of the seating pose analysis 43, i.e., the above-mentioned signals for the time in the current pose for the occupant 10, the seating pose comfort score and the activity index. These signals are processed by the recommendation engine 45 and are able to trigger events which provide a respective user recommendation 47 to the occupant 10.

Such an event is triggered if the seating comfort score is below a configurable threshold and/or if the time in the current pose exceeds a similar configurable threshold for the occupant 10. In these cases, the recommendation engine 45 triggers a "recommend pose change" command which is presented via a human machine interface to the occupant 10, e.g., on a display or on a screen. Moreover, a low activity index and a lack of body pose symmetry can trigger similar events and commands. Whether the user recommendation 47 is actually presented to the occupant 10 may further depend on additional inputs such as duration of the ride, the road environment, navigation information etc. Further recommendations may be "change your position in the seat", "perform some special activity/exercise" when the driving task is not requiring full attention (e.g., in a traffic jam or during automated driving), or simply "take an active break and get out of the car for some time", e.g., if some park or some restaurant is determined to be nearby.

In addition, the recommendation engine 45 can recommend to enable a massage seat function if the seating pose analysis 43 determines some discomfort which may cause back pain, which can be derived from the activity classification 39 and from the facial expressions 41. In addition, the recommendation engine 45 can also recommend adjusting the steering wheel position or the seat configuration if the relative position of the steering wheel 14 (see FIG. 1) and the shoulder, arm and hand points 25, 27, 29 is determined as being not favorable.

Results of the seating pose analysis 43, i.e., the time in the same pose, the seating comfort score and the activity index, are logged and reported in a trip summary 49 which can be combined with a user profile 53 and further accessed via a smartphone app, a website etc.

The input unit 19 of the system 11 is able to receive a user feedback 51 in response to the user recommendation 47. In detail, the occupant 10 can be registered and identified by the system 11 which is therefore able to store some personal preferences in a user profile 53 which is also part of the input unit 19. The user feedback 51 is therefore used as an update 55 for the user profile 53. An immediate user feedback 51 in response to the user recommendation 47 includes accepting or rejecting the recommendation. If the recommendation is accepted, similar recommendations will be provided in the future in similar situations. Conversely, if the current recommendation is rejected, this type of recommendation will be suppressed in the future. In addition, the user or occupant 10 can be able to suppress certain recommendations generally by system settings via the user profile 53. In addition, statistics 57 provided by the seating pose analysis 43 can also be used for updating the user profile 53. That is, the system 11 is partly customized to the specific occupant 10 via the seating pose analysis 43 and the statistic 57 automatically without requiring an action of the occupant 10.

As mentioned above, the user recommendation 47 is shown as a visual response to an event triggered by the recommendation engine 45. The visual response is shown on a screen of an infotainment system of the vehicle, e.g., as an icon or a dialog. Alternatively, the visual response of the system 11 may be shown on a head-up display. In addition, a short animation or a video clip can be shown motivating the occupant 10 to change the seating position, to do some stretching or to have an active break. Moreover, an audio guidance, e.g., using a virtual assistant, can be used. The input image sequence 31 can be additionally used by the system 11 in order to supervise the recommended activities of the occupant 10.

REFERENCE NUMERAL LIST 10 occupant
11 system
12 seat
13 sensing device, camera
14 steering wheel
15 processing unit
17 output unit
19 input unit
21 body point
23 facial point
25 shoulder point
26 back region
27 arm point
28 shoulder region
29 hand point
31 input image sequence
33 body point detection
35 facial point detection
37 static seating pose classification
39 action classification
41 facial expressions
43 seating pose analysis
45 recommendation engine
47 user recommendation
49 trip summary
51 user feedback
53 user profile
55 update
57 statistics

What is claimed is:

1. A method comprising:
    detecting an occupant in at least one image, the detection sufficient to associate a stored user profile with the occupant;
    identifying body points of the occupant based on the at least one image;
    classifying a pose of the occupant based on the identified body points;
    determining, via a neural network, a postural comfort of the occupant based on the classified pose of the occupant and at least one of a movement of the occupant or a facial expression of the occupant, the neural network trained to determine the postural comfort of the occupant by estimating a seating pose comfort score;
    determining a remaining trip duration based on navigation information;
    generating, via a recommendation engine, a recommendation for adapting the pose of the occupant based on the postural comfort of the occupant and the remaining trip duration; and
    providing the recommendation for adapting the pose of the occupant based on at least one of preferences in the stored user profile or a road condition, the recommendation provided as a visual response including at least one of:
        an icon shown on a head-up display of a vehicle;
        an icon shown on a screen of an infotainment system of the vehicle;
        a dialog shown on the head-up display of the vehicle; or
        a dialog shown on the screen of the infotainment system of the vehicle.

2. The method according to claim 1,
    wherein the at least one image comprises an image sequence, and wherein the calculation of the seating pose comfort score is based on the classified pose and the movement of the occupant, the method further comprising:
    determining, responsive to identifying body points, a temporal sequence of the body points based on the image sequence;
    estimating a displacement vectors for each of the body points based on the temporal sequence; and
    classifying the movement of the occupant based on the displacement vectors; and
    wherein the recommendation for adapting the pose of the occupant is provided further based on the classified movement of the occupant.

3. The method according to claim 2,
    wherein the body points include facial points which are identified and tracked based on the image sequence, and wherein the calculation of the seating pose comfort score is based on the facial expression of the occupant, the method further comprising:
    classifying, responsive to identifying body points, the facial expression based on the identified facial points; and
    wherein the recommendation for adapting the pose of the occupant is provided further based on the classified facial expression.

4. The method according to claim 1, wherein the recommendation for adapting the pose of the occupant is provided only if the seating pose comfort score is less than a predetermined threshold.

5. The method according to claim 1, further comprising:
    monitoring a position of the occupant over a predefined time period based on the identified body points at a beginning and at an end of the predefined time period; and
    providing the recommendation for adapting the occupant's pose if the occupant's position has not changed during the predefined time period.

6. The method according to claim 1,
    wherein the occupant is located on a driver seat; and
    wherein the body points include at least one of shoulder points, arm points, or hand points.

7. The method according to claim 6, further comprising:
determining a relative position of the at least one shoulder points, arm points, or hand points with respect to a steering wheel of the vehicle; and
providing, based on the relative position, a further recommendation for adapting the steering wheel.

8. The method according to claim 1, further comprising:
acquiring a response of the occupant to the recommendation, the response including at least one of accepting or rejecting the recommendation; and
determining one or more of a quantity and a type of future recommendations in accordance with the response of the occupant.

9. The method according to claim 8, wherein if the occupant accepts the recommendation, the method further comprises at least one of:
proposing guided activities for the occupant which depend on a driving condition and an environment of the vehicle; or
activating a massage seat function.

10. The method according to claim 1, further comprising:
classifying the pose of the occupant further based on a stored user profile of associated with the occupant.

11. The method according to claim 1, wherein the stored user profile comprises at least one recorded seating pose comfort score previously calculated.

12. A system comprising:
a sensing device configured to detect an occupant in at least one image;
a processing unit configured to:
associate a stored user profile with the occupant based on the detection of the occupant;
identify body points of the occupant based on the at least one image;
classify a pose of the occupant based on the identified body points;
determine, via a neural network, a postural comfort of the occupant based on the classified pose of the occupant and at least one of a movement of the occupant or a facial expression of the occupant, the neural network trained to determine the postural comfort of the occupant by estimating a seating pose comfort score;
determine a remaining trip duration based on navigation information; and
generate, via a recommendation engine, a recommendation for adapting the pose of the occupant based on the postural comfort of the occupant and the remaining trip duration; and
an output unit configured to provide the recommendation for adapting the pose of the occupant based on at least one of preferences in the stored user profile or a road condition, the recommendation provided as a visual response including at least one of:
an icon shown on a head-up display of a vehicle;
an icon shown on a screen of an infotainment system of the vehicle;
a dialog shown on the head-up display of the vehicle; or
a dialog shown on the screen of the infotainment system of the vehicle.

13. The system according to claim 12, wherein the system further comprises:
an input unit configured to acquire a response of the occupant to the recommendation, the response including at least one of accepting or rejecting the recommendation and one or more of a quantity and a type of future recommendations depends on the response.

14. The system according to claim 12, wherein the processing unit includes at least one of a machine-learning algorithm or a rule-based logic for classifying the pose of the occupant.

15. The system according to claim 12,
wherein the sensing device is configured to detect an image sequence,
wherein the seating pose comfort score is based on the classified pose of the occupant and the movement of the occupant, and
wherein the processing unit is configured to:
determine, responsive to identification of body points, a temporal sequence of the body points based on the image sequence,
estimate displacement vectors for each of the body points using the temporal sequence, and
classify the movement of the occupant based on the displacement vectors, and
wherein the output unit provides the recommendation for adapting the pose of the occupant is further based on the classified movement of the occupant.

16. The system according to claim 15,
wherein the body points include facial points which are identified and tracked based on the image sequence,
wherein the calculation of the seating pose comfort score is further based on the facial expression of the occupant, and
wherein the processing unit is configured to:
track the body points based on the image sequence,
derive a facial expression based on the identified facial points, and
classify facial expressions based on the identified facial points, and
wherein the output unit is configured to provide the recommendation for adapting the pose of the occupant is further based on one or more classified facial expressions.

17. The system according to claim 15, wherein the output unit is configured to provide the recommendation for adapting the pose of the occupant only if the seating pose comfort score is less than a predetermined threshold.

18. The system according to claim 12,
wherein the processing unit is configured to monitor a position of the occupant over a predefined time period by identifying the body points at a beginning and at an end of the predefined time period, and
wherein the output unit is configured to provide the recommendation for adapting the pose of the occupant if the position of the occupant has not changed during the predefined time period.

19. The system according to claim 12,
wherein the occupant is located on a driver seat,
wherein the body points include at least one of shoulder points, arm points, or hand points,
wherein the processing unit is configured to determine a relative position of the at least one shoulder points, arm points, or hand points with respect to a steering wheel of the vehicle, and
wherein the output unit is configured to provide, based on the relative position, a further recommendation for adapting the steering wheel.

20. The system according to claim 12, wherein the stored user profile comprises at least one recorded seating pose comfort score previously calculated.

* * * * *

UNITED STATES PATENT AND TRADEMARK OFFICE
CERTIFICATE OF CORRECTION

PATENT NO. : 11,878,708 B2
APPLICATION NO. : 17/805197
DATED : January 23, 2024
INVENTOR(S) : Alexander Barth et al.

It is certified that error appears in the above-identified patent and that said Letters Patent is hereby corrected as shown below:

In the Claims

Column 13, Claim 10, Line 23: after "profile", delete "of"

Signed and Sealed this
Fifth Day of March, 2024

Katherine Kelly Vidal
*Director of the United States Patent and Trademark Office*